April 4, 1967 N. J. FROIO 3,312,320
CONVEYOR BRAKING ROLLER
Filed March 18, 1966 2 Sheets-Sheet 1

INVENTOR
NICHOLAS J. FROIO
BY Harbaugh and Thomas
ATTYS.

April 4, 1967  N. J. FROIO  3,312,320
CONVEYOR BRAKING ROLLER
Filed March 18, 1966

INVENTOR
NICHOLAS J. FROIO
BY *Harbaugh & Thomas*
ATTYS

United States Patent Office 3,312,320
Patented Apr. 4, 1967

3,312,320
CONVEYOR BRAKING ROLLER
Nicholas J. Froio, Harvey, Ill., assignor to Froio Corporation, a corporation of Illinois
Filed Mar. 18, 1966, Ser. No. 535,587
11 Claims. (Cl. 193—35)

The present invention relates to reaction rollers for controlling the speed of otherwise freely moving articles and packages whose movement is induced by gravity, and includes more particularly by way of example, speed retarding rollers for safely advancing packages and pallets automatically from a loading or storage position to an unloading position without application of propelling power or personal attention.

Although brakes have been used to control the velocity of articles transported on roller conveyor tracks to avoid excessive speeds, they generally have of necessity been of such size that they could not be located in line with the rollers themselves but had to be located laterally thereof where their speed sensing members would co-operate with an element or a surface expressly provided for that purpose on the moving articles, or, be located at one side thereof where a frictional drag is exerted against a longitudinal member such as a rail, support or a skid generally found on pallets handled by fork lift trucks.

Generally, these types of brakes have involved elaborate speed reduction gear trains driven by a wheel that is responsive to movement of an article. These gear trains impose an inordinate frictional gearing load on the wheel regardless of speed. The gear trains generally end at the last gear with a brake which is either constant or centrifugally responsive in its operation. Although centrifugal braking varies with speed, the friction present in the gearing itself imposes so great an initial load on the system when the moving article starts the wheel responsively turning, that it is undesirable to have two wheels driven by the articles at the same time because the doubled frictional gearing load reduces the advance of the article too much. On the other hand if the wheels are separated far enough to avoid multiplied retardation forces, such permits accelerations between wheel engagements that involve shocks between the accelerating article and the brake wheels which severely damage gear teeth and other parts unless substantial slippages are provided at the initial contacts, or additional shock absorbing devices are provided. Such involve substantial increases in manufacturing costs.

Moreover, due to the large radial size of the wheel heretofore required to house gearing and associated brake shoes etc. in conventional devices, the blow of the article impact upon the wheel at such a radial leverage, peaks the very heavy load on the gears unless the wheel is only an intermediate member with double slippage as where its tread surface merely transmits frictional drive from the article to a knurled frictionally driven roller of minimal size heading the gear train.

In the present invention a speed retarding or restraining roller of a radial size and length is contemplated that can easily replace a regular conveyor roller at closely spaced points on a conventional roller conveyor and includes a novel braking mechanism completely enclosed therein which has a low percentage of initial inertial drag, and, under both start and running conditions has very little gear friction whereby the speed throttling effort is carried almost entirely by brake shoes engaging a braking surface such as found on a brake drum.

The invention is further characterized by a roller length substantially equalling the length of a regular conveyor roller having a small diameter and light inertia so that it will respond quickly to the speed of an article engaging it to provide quick rolling friction therebetween under the prompt subsequent control of centrifugally responsive brake shoes.

A further object of the invention is to substantially eliminate gearing friction in a simplified gear train with power transmitting effort divided among a plurality of intermediate gear and drive engagements disposed in parallel between the first and last gears with the terminal gear mounted coaxially with the drive gear and with the roller, the terminal gear carrying coaxially mounted centrifugal mounted brake shoes that engage a coaxial braking surface carried by the roller itself whereby frictional brake shoe retardation of rotation is established directly against a surface on the roller itself or a drum carried concentrically by the roller; and further the braking action is uniform regardless of the direction of roller rotation and regardless of whether the shoes and brake surface are rotated in opposite directions or the same direction at different speeds.

The invention is also characterized by the speed retarding roller serving as a brake drum support that transmits directly through itself to the moving article the braking action derived from the centrifugally actuated brake shoes.

The invention contemplates disposing coaxially in the roller and holding stationary either the planet gear unit or the ring gear unit of a planetary gear train while the other is secured to the roller so that the centrifugal drive and braking action directly begins and ends with and within the roller with high efficiency.

The invention contemplates that regardless of the actual directions of rotation of the roller and the brake shoes, a stub shaft is locked against rotation and rotatably supports the roller at one end thereof, while at the other end it locks either the planet gear unit or the ring gear unit against rotation. The roller carries the other one of the two units at a speed induced by an article moving over it on the conveyor whereby all resulting forces and elements are coaxially and dynamically balanced and supported within the roller including those of the sun gear, the planet gears, the centrifugally responsive brake shoes and the brake surface carried by the roller.

A further object of the invention is to utilize the rotation of the speed retarding roller directly in a slowing action by movement thereof in a direction opposite to the direction of rotation of centrifugally actuated brake shoes whereby a soft braking action at relative high brake surface speeds is attained in a relationship in which the travel distance between the brake shoes and drum varies geometrically with roller speed changes while the rotational speed of the brake shoes varies arithmetically.

A further object of the invention is to provide in a device of the class described, a braking action between centrifugally responsive brake shoes and a braking surface rotating in the same direction but at different speeds whereby the increased frictional coefficients of slow relative movement between brake shoes and a drum provide speed and centrifugal force of the brake shoes that varies rapidly while the relative travel between the brake shoes and drum vary narrowly at a closely critical speed.

A further object of the invention is to provide a braking mechanism which can be inserted in either end of a cylindrical roller, or, if desirable to double the braking strength in both ends thereof at any given station, yet maintaining substantially the same conveying speed regardless of the direction of rotation of the roller.

Another object of the invention is to provide a speed throttling device of the class described which is inexpensive to build in that sintered metal gears and brake parts can be used extensively, prototype devices can be provided in inexpensive small sizes for multiple use with various types of rollers; the structure, assembly and servicing are quite simple with some of the parts reversible or interchangeable for adaptations frictionally with varying operational results; and, same can be used in conventional roller conveyors, in place of regular rollers at spaced points therealong for either multiple engagements or single engagements with any given article or range of sizes of articles including intermixed sizes handled by roller conveyors with a resilient reciprocation vertically that establishes a constant pressure and speed control upon packages that move over it.

These being among the objects of the invention other and further objects will become apparent from the description and the disclosures of the drawings taken in conjunction therewith in which like numerals refer to like parts.

Figure 1:
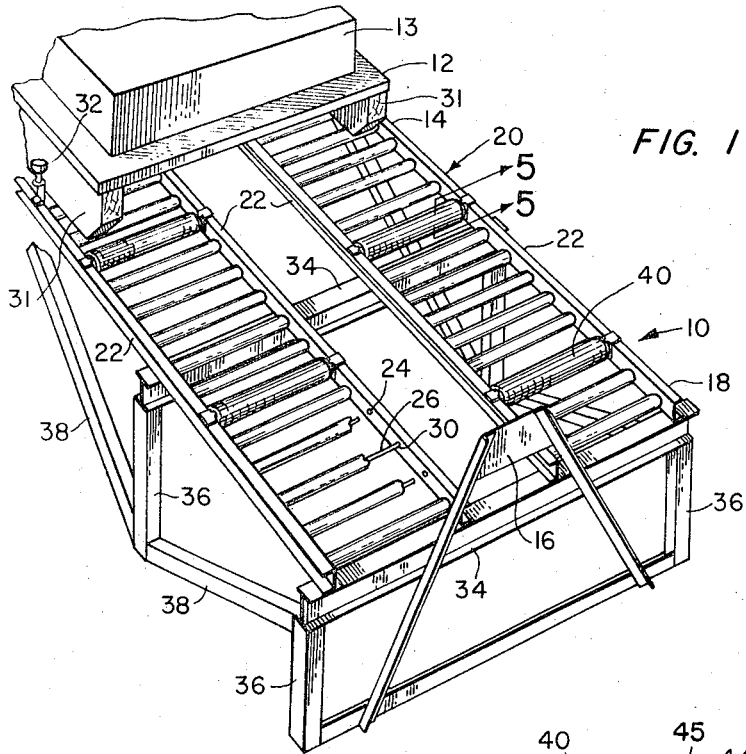
FIG. 1 is a perspective view of a portion of an inclined roller conveyor track upon which pallets may be loaded at one end and removed from the other end while the pallets intermediate the stations are stored and advancing step by step as they are removed one by one from the unloading end.

Referring now to the drawings in further detail, a double track roller conveyor 10 is shown with a 2°–3° inclination so that pallets 12 with articles 13 thereon can advance under the influence of gravity from the higher end 14 and come to rest against a bumper 16 at an unloading station at the lower end 18. The tracks 20 of the conveyor are made up of two pairs of laterally spaced U-shaped channel members 22 extending the length of the conveyor. Each pair is provided with longitudinally spaced aligned holes 24 which receive interconnecting cross shafts 26 upon which the rollers 28 are journalled, preferably with frictionless bearings 30 so that the skids 31 of the pallets may advance quite freely the length of the conveyor as guided by side rollers 32 bolted to the top of the channel member 22 along the way.

The tracks 20 preferably are made up of unitary sections secured end to end that are bolted in supported relation upon cross beams 34 which in turn are supported on upright legs 36 suitably braced by members 38 for rigidity. It will be observed that the assembly described can be located at any elevation and can in large numbers be tiered and otherwise arranged to provide a substantial storage capacity for miscellaneous articles 13 carried on the pallets so that they are handled by fork lift trucks (not shown). A fork lift truck places the pallets 12 on selected conveyors at their higher ends and the pallets advance by gravity towards the lower ends. If there are more than one pallet on a conveyor, they gravitate into abutting alignment and await their turns to be lifted off by a fork lift truck at the lower end, the entire line advancing each time the lower end one is removed, thereby providing first-in and first-out article storage facilities.

It will be appreciated that the speed of advance for each and all pallets must be controlled to avoid runaway dangers and damage. Accordingly, novel speed retarding rollers 40 are interspersed among the regular rollers, preferably in a spaced relation whereby each pallet skid 31 may engage the next one before it leaves a preceding one, and preferably with the retarding rollers alternately arranged in stepped relationship between the two tracks so that track sections for original installations can be made identically and then the sections for one track can be turned end for end with respect to those of the other track and between the two tracks the retarding rollers will be staggered for alternate contact with the skids of each pallet.

As noted in the objects and for a fuller understanding of the description to follow, it is most desirable that the movement of the pallets be comparatively slow and substantially constant with no irregularity that conventionally occurs with intermittently applying drags that are either a doubling or a halving of the application of high gear frictional drags upon each pallet as it moves along the track. In the present invention, the pallet or a series of pallets can alternately overlap two or more retarding rollers or be in contact with only one roller with little if any change of speed since once each brake roller is turning, practically the only retardation effort exerted on the pallet is that of the braking or clutching action of the centrifugal elements. Gear friction is minimal.

Figure 2:
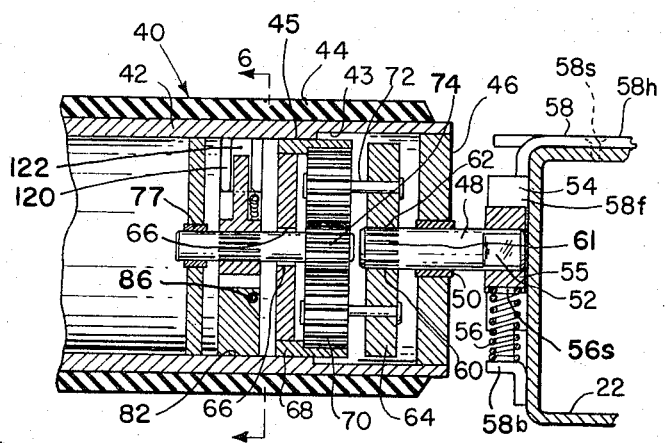
FIG. 2 is a lateral view in longitudinal section of one end of a brake roller embodying the invention.
Figure 3:
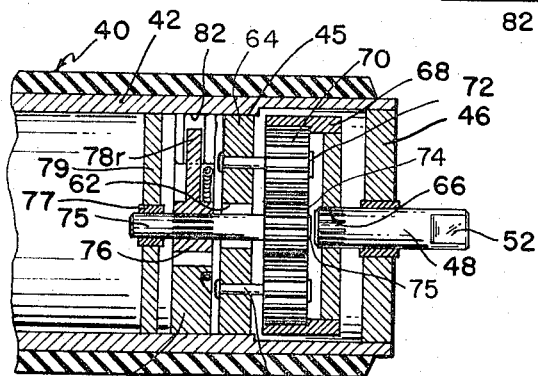
FIG. 3 is a view similar to FIG. 2 showing a modified arrangement of the cooperating elements shown in FIG. 2.
Figure 8:
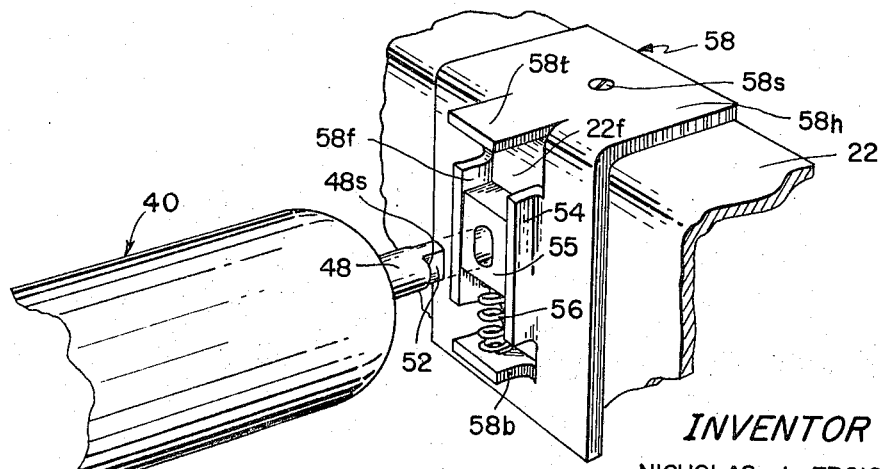
FIG. 8 is a perspective view of the roller conveyor partly in section showing the mounting and vertical movement of the brake roller on the conveyor frame.

In accomplishing this it will be observed in the embodiments shown in FIGS. 2 and 3 that all parts are identical. Just the arrangement differs. The retarding rollers 40 comprise cylindrical metal sleeves 42 internally counterbored at the ends as at 43 and externally having elastomer treads 44 secured to their outer surfaces for engagement by the pallet skids 31. Two end caps or plugs 46 press fitted into the outer ends of the counter-bores close the ends and rotatably support each sleeve upon stub shafts 48 by conventional frictionless or sintered bearings 50. The outer ends of the stub shafts are preferably milled to provide flats or wrench type contours 52 for non-rotatively supporting the shafts but permitting vertical movement as urged upwardly by a compression spring 56. The flattened portions may directly engage the sides of a slot 54 but are preferably carried by slide blocks 55. The slide blocks in turn can be vertically reciprocated either in a vertical slot provided directly in the channel member 22 or in a vertical slot 54 provided in a heavy sheet metal stamped bracket 58 secured to the channel members at desired locations. The brackets employed (FIGS. 2 and 8) comprise a flat upper head 58h apertured to receive a screw 58s and having depending parallel legs 58 of a U-shaped type hanger defining guide flanges 58f engaging blocks 55 interlocked with the flats 52. The bottom 58b of the hanger is conformed to receive the lower end of a compression spring 56 and also a socket 56s is provided in the slide block 55 to hold the upper end of the spring in place. The spring normally supports the shaft high enough that the top of the retarding roller is above the rest of the rollers for assured engagement with the skids 31 under adequate spring pressure.

The inner end 60 of the stub shaft 48 is longitudinally knurled or ribbed as at 61 to receive non-rotatably with a press fit thereon, either the center 62 of the planet gear member or cage 64 (FIG. 2) or the center 66 of a ring gear member 68 (FIG. 3), both of which are correspondingly configured for the interchangeability and both of which have an outside dimension which clears the counter-bore 43 in these embodiments but has an interference fit with the inside diameter of the sleeve at 45.

In FIG. 2 the ring gear is non-rotatively secured by a class one press fit to the sleeve 42 adjacent to the counter-bore 43 at 45 where it is in mesh with planet gears 70 that are journalled on shafts 72 carried by the cage 64. With the shafts stationary the planet gears 70 thereon rotate in the same direction of rotation as the sleeve 42 while a sun gear 74 in mesh with the planet gears 70 is rotated at a much higher rate of speed in the opposite direction.

In FIG. 3 the planet gear cage 64 is non-rotatively press fitted to the sleeve 42 adjacent to the braking surface 82 on the inside of the sleeve. The ring gear 68 therefore being held stationary by the shaft 48, the planet gear cage rotates with the roller 40. The planet gears 70 carried thereby react with the ring gear and drive the sun gear 74 in the same direction as the roller but at a much faster rate of speed.

Figures 4, 5:
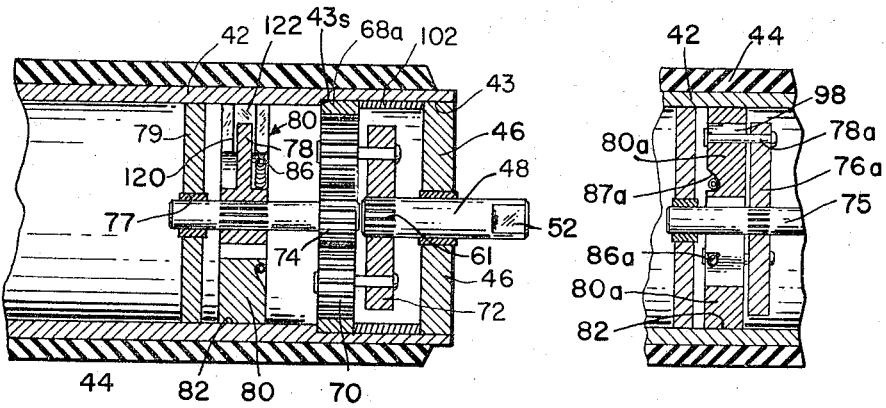
FIG. 4 is a view similar to FIG. 2 showing the preferred construction and arrangement of cooperating elements.
FIG. 5 is a sectional view showing the brake shoe construction providing the acceleration dynamics described herein.

The sun gear 74 is hobbed on a shaft 75 which had press fitted thereto a brake shoe carrier plate 76 having a plurality of pins 78 upon which brake shoes 80 are mounted with a pivotal action to coact with the braking surface 82. In FIG. 4 the pins 78r are radially disposed while in FIG. 5 the pins 78a are axially disposed.

The brake surface can be upon a cylindrical drum element press fitted in the sleeve 42 but preferably the inner surface of the sleeve 42 itself. This surface, however provided, is referred to herein as a drum or braking surface 82. The braking surface and the ring gear 68 are rotated as a unit with the roller sleeve 42. The other end of the shaft 75 is journalled in an oil carrying sintered sleeve bearing 77 supported on a wall plate 79 press fitted in sleeve 42.

A contraction spring 86 urges the shoes 80 inwardly away from contact with the braking surface 82 under resting conditions, and its strength can be varied by adjustment or replacement to provide a desired centrifugal response to the speed of rotation of the brake shoes. In the embodiment shown in FIG. 5 it is located in an outer circular groove 87o provided in the brake shoes themselves where its contractive effort with necessary elongation is substantially minimized so that centrifugal force is essentially the controlling braking factor.

It was noted that the center 66 of the ring gear member 68 is interchangeable with the center 62 on the planet gear cage to provide embodiments of either FIG. 2 or FIG. 3. Such interchangeability can be dispensed with if desired for compactness and lightness as shown in FIG. 4 in which the ring gear 68a is merely a sintered oil impregnated ring member that telescopes tightly with a class one fit within the roller sleeve 42. In this case the fit can make up with the counter-bore 43 against its shoulder 43s, a spacing ring 102 being employed for assembly convenience if desired.

In assembling this embodiment the gear housing wall 79 is telescoped snugly and press fitted to its resting position. The brake shoe assembly 80 with the sun gear 74 is inserted into working position. This will be easily accomplished since the spring 86 normally retracts the shoes and they then cooperate with the inside wall of sleeve 42. The ring gear 68a is then press fitted into place, the planet gears 70 and cage 72 follow on the stub shaft 48, and finally the plug 46.

It will be observed that the brackets 58 carrying the slide blocks are assembled to the rollers by slipping the flattened end 52 of the stub shafts into the correspondingly configured holes in the slide blocks 55 and then dropping them into place on the conveyor channels 22 where they are fastened in place by flat headed screws 58s. A tab 58t left in the shear and bending of the stamping then prevents vertical removal of the slide blocks above a certain level and can be deflected downwardly at the time of installation to engage the slide block and determine the resting height of the roller if such is not an original installation. The face 22f of the channel 22 slidably supports the outer side of the blocks 55 while shoulders 48s on the stub shafts hold the blocks in their assembled relationship in the slideways.

Conventional type of brake shoes can be used in the invention but it is preferred that novel self energizing shoes be used for both unidirectional or bidirectional rotation of the roller. The bidirectional shoe is desirable where the roller may be operationally rotated in either direction irrespective of orientation.

The brake shoes are two, three or four in number and rounded as shown on their outer surface 96 to mate with the braking surface 82 as pivotally and slidably mounted for movement in a radial direction on the pins 78, there being enough clearance or looseness in a radial direction that take up for wear is provided. Such an instance would be where conveyor track sections are manufactured as a standard item with the bidirectional speed retarding rollers installed without specific direction orientation as original equipment. The sections can then be installed irrespective of which end is lower and uniform operativeness would still be assured. Another instance would be the advantage of controlled reverse movement if anyone endeavored to move the pallets in either direction at a speed dangerous to the equipment.

Figures 6, 7:
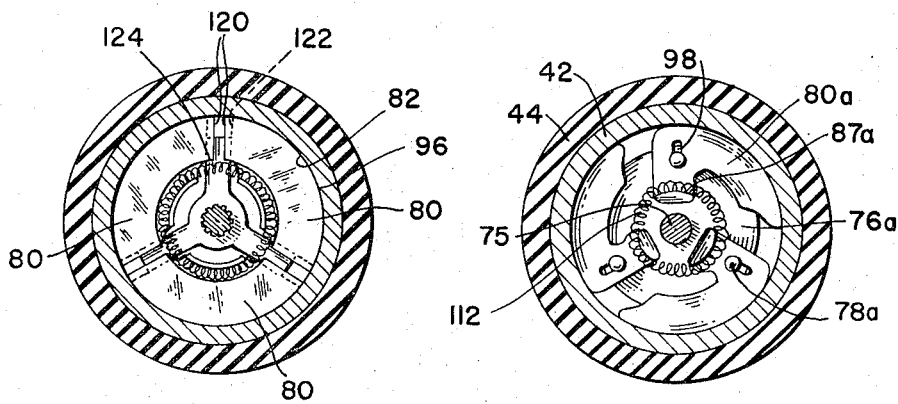
FIG. 6 is a section taken upon the line 6—6 in FIG. 2 showing an end elevational view of the brake shoes shown in FIGS. 1, 3 and 4.
FIG. 7 is a sectional view taken on line 7—7 in FIG. 1 showing the brake shoes shown in FIG. 5.

The preferred bidirectional embodiment is also self energizing in both directions. Reference is made to FIGS. 4 and 6 showing this embodiment in which three arcuate brake shoes 80 are shown having adjacent radially disposed end faces 120 radially grooved as at 122. When installed in end facing spaced relationship as shown, the two facing grooves 122 and their spacing provide radial openings for receiving the radially disposed rotary drive pins or ears, already mentioned, with the body portions of the shoes adjacent to the grooves at opposite ends thereof normally resting if desired, on shoulders 124 provided on the ears 78r. However, it is to be noted that the ends of adjacent shoes can rest upon each other or upon the ears depending upon the clearance provided between the parts as long as in their resting positions they do not press against the braking surface 96.

The brake shoes can be cut from thick walled tubing whose outside diameter is the same as the diameter of the braking surface 82, and then sectioned by radial cuts which provide a resting clearance, then end milled to provide the grooves 122 and either circumferentially grooved externally or internally by a suitable machining operation as at 87 for the reception of a circular shoe retracting spring 86. Preferably however, the shoes are cast in the form shown of a ferrous metal or sintered non-ferrous metal.

In operation, the carrier plate 76 begins to rotate and accelerate until the centrifugal force is enough to carry the shoes into contact with the braking surface. As the shoes move outwardly each remains in engagement with the pin 78 that is propelling it and the free end of the shoe is driven by a contact with the pin 78 which is of less radius than the center of gravity of the shoes creating an additional servo force for the braking action. This is true in either direction of rotation.

Referring to the unidirectional shoe embodiment shown in FIGS. 5 and 7, it will be observed that the center of gravity of each shoe 80a is circumferentially ahead of its axially disposed pivot pin 78a and the shoes can be oriented to the intended direction of rotation when the carrier plate 76a is pressed onto the sun gear shaft.

Not only are the centers of gravity ahead of the pivotal support but they also are at a working radial distance greater than that of the pins whereby the pins 78a tend to assist in providing a servo action assisting centrifugal in direct relation to the centrifugally created between shoes and drum. This action is substantially unopposed by the springs 78a. Furthermore, radially inwardly of the pins 78a the shoes 80a are provided with weighted inertia arms 112 that are responsive to sun gear acceleration with a lagging inertia that opposes the centrifugal force as levered about the pivot pin 78a. This start-up inertial force ends with the quick decline of acceleration as a constant rotational speed is approached, but during initial acceleration the shock of a moving pallet contacting a stationary roller is reduced by momentary retardation of the centrifugal force being imposed until substantial roller speed is attained after which further speed increase is controlled frictionally as the lag inertia of the weighted arms 112 is quickly converted to centrifugal force supplementing that which is lost by removal of shoe material to provide the radial slot 98 for the pin 78. In operation, the radial component of the effective centrifugal forces is maximum since the center of the masses are near the maximum circumference.

Having thus described the invention and preferred embodiments with respect to desirable structural relationships concerned with roller conveyors illustrated by way of example, it will be understood by those skilled in the art how the stated objects are attained and how various uses can be made thereof in lowering gravity moved articles at controlled speeds, and further adaptation can be made thereof in which either the roller or the shaft can be secured against rotation with the other retarding the gravity moved load without departing from the spirit of the invention, the scope of which is commensurate with the appended claims.

What is claimed is:

1. A speed retarding device for an article moved by gravity comprising shaft means non-rotatively supported in weight bearing relationship, a hollow roller journalled on said shaft means, planetary gear means within said roller having intermeshing sun, ring and planetary gear units, one of said units being held stationary by said shaft means, another of said units being rotated by said hollow roller, and a third of said units being rotated by the interaction of the other two units, a braking surface means carried by said roller, centrifugally responsive brake shoes carried by said third unit moved by centrifugal force into frictional engagement with said braking surface means, and means interconnecting said roller and moving article for rotating said roller and retarding said gravitational movement of the article.

2. The combination called for in claim 1 in which said one unit is said planetary gear unit.

3. The combination called for in claim 1 in which said one unit is said ring gear unit.

4. The combination called for in claim 1 in which said third unit includes radially extending drive pins, and said brake shoes have recesses at their ends engaging said pins for relative radial movement with respect thereto under centrifugal force.

5. The combination called for in claim 1 in which said third unit includes axial extending support pins, and said shoes being pivotally movable on said pins and having a braking portion whose center of gravity is circumferentially ahead of the pin in the direction of rotation and an inertial weight portion located radially inward of the pins.

6. A speed retarding roller for articles moved by gravity upon a roller conveyor comprising shaft means, means carried by said conveyor supporting said shaft means against rotation, a hollow roller journalled on said shaft means, planetary gear means having intermeshing sun, ring and planetary gear units therein, one of said units being held stationary by said shaft means, another unit being rotated by said hollow roller, and a third unit being rotated by the interaction of the other two, a brake drum means on said roller, centrifugally responsive brake shoes carried by said third unit moved by centrifugal force into frictional engagement with said drum means, an engageable tread on said roller for contacting an article moving along said conveyor, and resilient means for urging the shaft means vertically to move said roller into predetermined pressure engagement with articles on said roller conveyor.

7. The combination called for in claim 6 in which said shaft supporting means comprises a bracket secured to the conveyor and having depending hanger members defining a vertical slot non-rotatably receiving the shaft means in vertically slidable relationship, means limiting upward vertical movement of the shaft means under movement urged by said resilient means.

8. The combination called for in claim 6 in which said conveyor has two laterally spaced longitudinal side frame members supporting a series of parallel rollers crosswise between them disposed in a common plane, and said shaft supporting means includes brackets mounted on said frame members supporting said shaft means against rotation between two adjacent parallel rollers.

9. The combination called for in claim 6 in which said brake shoes comprise, centrifugally responsive portions pivotally mounted on said third unit with their centers of gravity disposed rotationally ahead of their respective pivotal axes, and inertia responsive portions disposed radially inwardly of said pivotal axes responsive to acceleration of said third unit, and resilient means interconnecting said shoes opposing centrifugally responsive movement of said centrifugally responsive portions.

10. A speed brake for articles moved by gravity comprising shaft means non-rotatively carried by the brake, a hollow roller journalled on said shaft means, planetary gear means having intermeshing sun, ring and planetary gear units therein, one of said units being held stationary by said shaft means, another unit being rotated by said hollow roller, and a third unit being rotated by the interaction of the other two, a brake drum means carried by said roller, centrifugally responsive brake shoes carried by said third unit moved by centrifugal force into frictional engagement with said drum means, means for rotating said roller by an article moving under the influence of gravity, said brake shoes comprising centrifugally responsive portions pivotally mounted on said third unit with their centers of gravity disposed rotationally ahead of their respective pivotal axes, and inertia responsive portions disposed radially inwardly of said pivotal axes responsive to acceleration of said third unit for opposing centrifugally responsive movement of said centrifugally responsive portions.

11. An inclined roller conveyor for transporting articles from a loading station to an unloading station comprising a plurality of parallel tracks comprising side frames, a series of parallel rollers crosswise between the side frames disposed in a common plane, said rollers including speed retarding rollers spaced lengthwise of the side frames alternately in the tracks comprising shaft means having non-rotative contours on their ends, hollow rollers journalled on said shaft means each hollow roller including a cylindrical sleeve, planetary gear means having intermeshing sun, ring and planetary gear units in the sleeve, one of said units being held stationary at one end of each shaft means, another unit being rotated by the sleeve and a third unit being rotated by the interaction of the other two units, a brake drum means carried by the sleeve, centrifugally responsive brake shoes carried by said third unit moved by centrifugal force into frictional engagement with said drum means, an engageable tread on each sleeve for contacting an article moving along said conveyor on said rollers, means for supporting each hollow roller for vertical movement, and resilient means for urging the stub shafts vertically to move said hollow roller into predetermined pressure engagement with articles moving on said roller conveyor.

References Cited by the Examiner
UNITED STATES PATENTS

| 2,134,373 | 10/1938 | Parker | 193—35 |
| 2,738,103 | 3/1956 | Bisese | 193—35 |

EVON C. BLUNK, *Primary Examiner.*

H. C. HORNSBY, *Assistant Examiner.*